(12) United States Patent  
Sukenari et al.

(10) Patent No.: US 7,815,378 B2  
(45) Date of Patent: Oct. 19, 2010

(54) VISUAL PRESENTER

(75) Inventors: Kazuhiro Sukenari, Nagoya (JP);  
Shinji Ono, Nagoya (JP)

(73) Assignee: Elmo Co., Ltd., Aichi (JP)

( * ) Notice: Subject to any disclaimer, the term of this patent is extended or adjusted under 35 U.S.C. 154(b) by 154 days.

(21) Appl. No.: 12/012,567

(22) Filed: Feb. 4, 2008

(65) Prior Publication Data

US 2008/0187309 A1 Aug. 7, 2008

(30) Foreign Application Priority Data

Feb. 5, 2007 (JP) .............................. 2007-025519

(51) Int. Cl.
- G03B 17/00 (2006.01)
- G03B 23/00 (2006.01)
- G02F 1/1335 (2006.01)
- H04N 5/225 (2006.01)

(52) U.S. Cl. ....................... 396/419; 396/428; 348/373; 349/6; 353/103

(58) Field of Classification Search .................. 396/419  
See application file for complete search history.

(56) References Cited

U.S. PATENT DOCUMENTS

| | | | |
|---|---|---|---|
| 5,933,191 A * | 8/1999 | Ariga et al. .................. 348/373 |
| 6,008,846 A | 12/1999 | Uehara et al. ............... 348/373 |
| 6,064,426 A * | 5/2000 | Waterman ..................... 348/63 |
| 2005/0122488 A1* | 6/2005 | Fernandez ................... 353/120 |
| 2008/0007792 A1* | 1/2008 | Sun et al. ..................... 358/403 |

FOREIGN PATENT DOCUMENTS

| | | |
|---|---|---|
| JP | 10-191105 | 7/1998 |
| WO | WO 00/36839 | 6/2000 |

OTHER PUBLICATIONS

Merriam Webster's Collegiate Dictionary, Tenth Edition, copyright 2001, definition of "bend", 3 pages.*  
Machine English Translation, JP, 10-191105, Jul. 21, 2009, 51 pages.*

* cited by examiner

*Primary Examiner*—Melissa J Koval  
(74) *Attorney, Agent, or Firm*—William L. Androlia; H. Henry Koda (57) ABSTRACT

A visual presenter includes a base, an upright portion standing from the base and having a distal end, a support column including a horizontal portion formed by bending the distal end of the upright portion so that the horizontal portion protrudes forward away from the base, the horizontal portion having a distal end, an imaging camera head mounted on the distal end of the horizontal portion, and a pivot portion provided on the upright portion of the support column so that the horizontal portion is pivotable horizontally.

2 Claims, 12 Drawing Sheets

VISUAL PRESENTER

CROSS-REFERENCE TO RELATED APPLICATIONS

This application is based upon and claims the benefit of priority from the prior Japanese Patent Application No. 2007-025519, filed on Feb. 5, 2007, the entire contents of which are incorporated herein by reference.

BACKGROUND OF THE INVENTION

1. Field of the Invention

The present invention relates to a visual presenter which displays on a monitor, screen or the like a captured image of material placed on a placement surface of a stage.

2. Description of the Related Art

As one of conventional visual presenters, Japanese Patent Application Publication JP-A-H10-191105 discloses an image input device comprising a support column constructed by connecting two column members by joints mounted on ends thereof respectively. The support column has a distal end on which a camera head is pivotally mounted. The joints comprise respective hinges each of which provided with a plurality of indexes in order that the camera head may be located at a height suitable for photographing manuscript with a predetermined size. The joints are adjusted to the same indexes so that the camera head is adjusted to a predetermined height.

In the foregoing image input device, however, a plurality of hinges need to be adjusted to the same indexes so that the camera head is adjusted to a suitable height. As a result, the image input device has a low operability. Furthermore, since the image input device has a plurality of joints and hinges, the structure of the image input device is complicated. Additionally, storing the image input device is troublesome.

SUMMARY OF THE INVENTION

Therefore, an object of the present invention is to provide a visual presenter which has a support column having a simplified structure and accordingly which can improve operability and easiness to store, and which can be rendered more compact when stored.

The present invention provides a visual presenter comprising a base, an upright portion standing from the base and having a distal end, a support column including a horizontal portion formed by bending the distal end of the upright portion so that the horizontal portion protrudes forward away from the base, the horizontal portion having a distal end, an imaging camera head mounted on the distal end of the horizontal portion, and a pivot portion provided on the upright portion of the support column so that the horizontal portion is pivotable horizontally.

The support column comprises the upright portion standing from the base and the horizontal portion which is formed by bending the distal end of the upright portion so that the horizontal portion protrudes forward away from the base. Thus, since the support column has no joints and hinges, the structure thereof can be simplified and accordingly, the operability and easiness to store can be improved. Furthermore, the pivot is provided on the upright part of the support column so that the horizontal portion is pivotable horizontally. As a result, the imaging camera head and the horizontal portion protruding toward the front side of the upright portion can be moved over the base. Consequently, the visual presenter can be rendered more compact when stored.

In one embodiment, the visual presenter further comprises a pivot shaft which is provided on the distal end of the horizontal portion so as to be coaxial with the horizontal portion, wherein the imaging camera head is pivotally mounted on the pivot shaft. The imaging camera head and the horizontal portion protruding toward the front side of the upright part can be moved over the base when the visual presenter is stored, and the camera head can be rendered perpendicular to the base. Consequently, the visual presenter can be rendered more compact when stored.

BRIEF DESCRIPTION OF THE DRAWINGS

Other objects, features and advantages of the present invention will become clear upon reviewing the following description of the embodiment with reference to the accompanying drawings, in which.

DETAILED DESCRIPTION OF THE INVENTION

Figure 1:
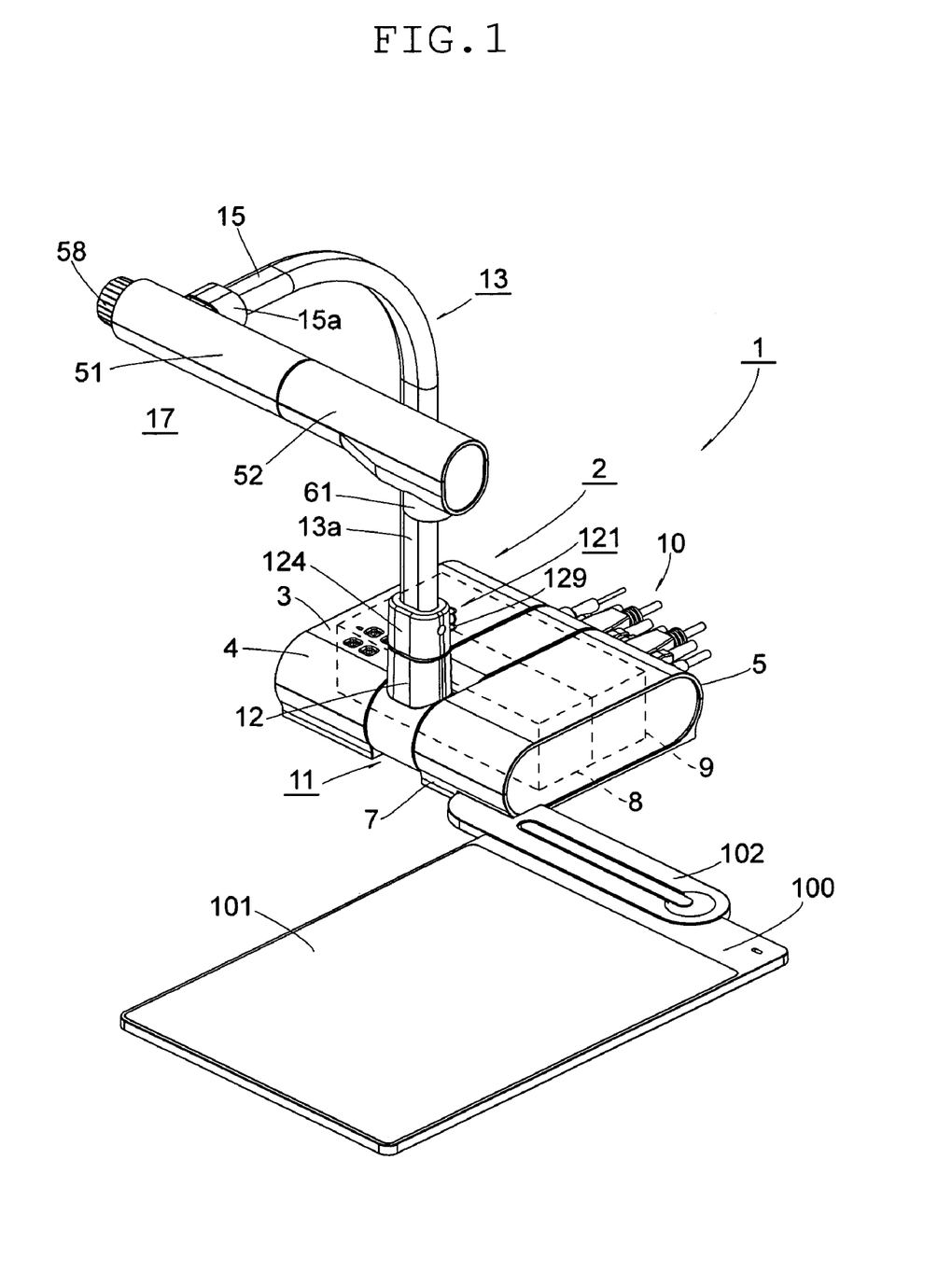
FIG. 1 is a perspective view of a visual presenter in accordance with one embodiment of the present invention.
Figure 11:
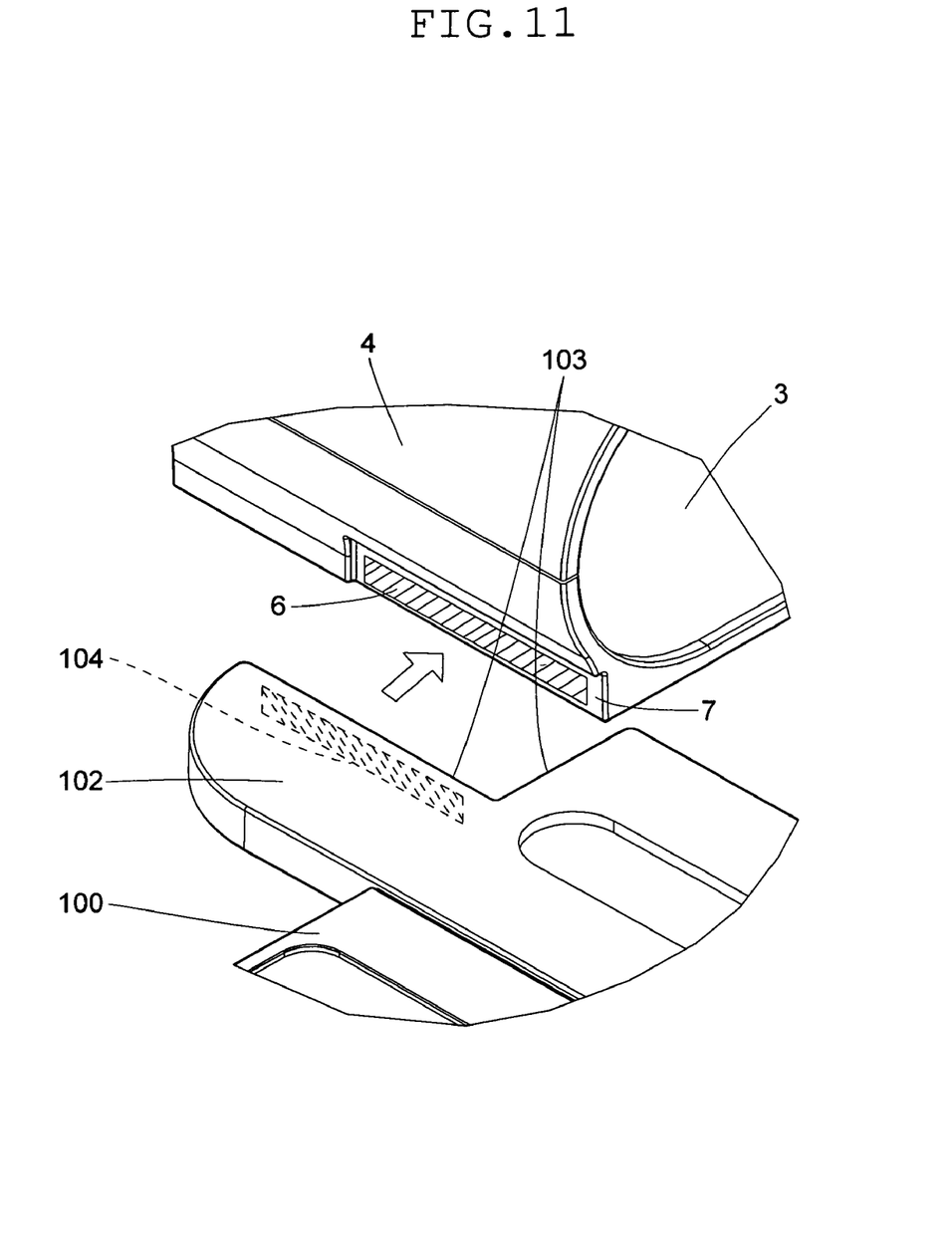
FIG. 11 is a perspective view of a stage.

One embodiment of the present invention will be described with reference to the accompanying drawings. Referring to FIG. 1, a visual presenter 1 of the embodiment is shown. The visual presenter 1 comprises a body 2 and a stage 100 coupled to the body 2. The body 2 includes a base 3, a support column 13 and an imaging camera head 17. The base 3 is formed into a rectangular shape and has a front 4 and a rear 5 both of which have curved faces. A positioner 7 is formed in a corner of a lower edge of the front 4 and a rear 5 both of which have respective curved faces as shown in FIG. 11. The positioner 7 includes a magnet piece 6 affixed thereto.

A control circuit unit 8 and a weight 9 are enclosed in the base 3. The weight 9 prevents the rear 5 side of the base 3 from rising when the support column 13 is inclined frontward, as will be described later. Furthermore, various connecting sockets 10 and the like are provided on the rear 5 of the base 3 for ensuring electrical connection between external equipment and the visual presenter 1. A tilting section 11 is mounted on substantially a central part of the curved surface 4 side of the base 3 to support the support column 13 so that the support column 13 is capable of tilting. The tilting section 11 has an upper surface on which a pivoting section 121 with a pivot shaft support 12 is provided. The pivoting section 121 will be described later.

The support column 13 is hollow such that wire harness (not shown) is insertable through the support column 13. A curved portion 14 is formed on a distal end of the support column 13. The curved portion 14 has a distal end on which a horizontal portion 15 protruding in such a direction that the horizontal portion 15 is spaced away from the front 4 of the base 3. Furthermore, the horizontal portion 15 has a distal end on which a coupling member 15a is mounted. The coupling member 15a also has a distal end on which a hollow pivot shaft 16 formed so as to be coaxial with the coupling member 15a. An imaging camera head 17 is pivotally mounted on the hollow pivot shaft 16.

Figure 2:
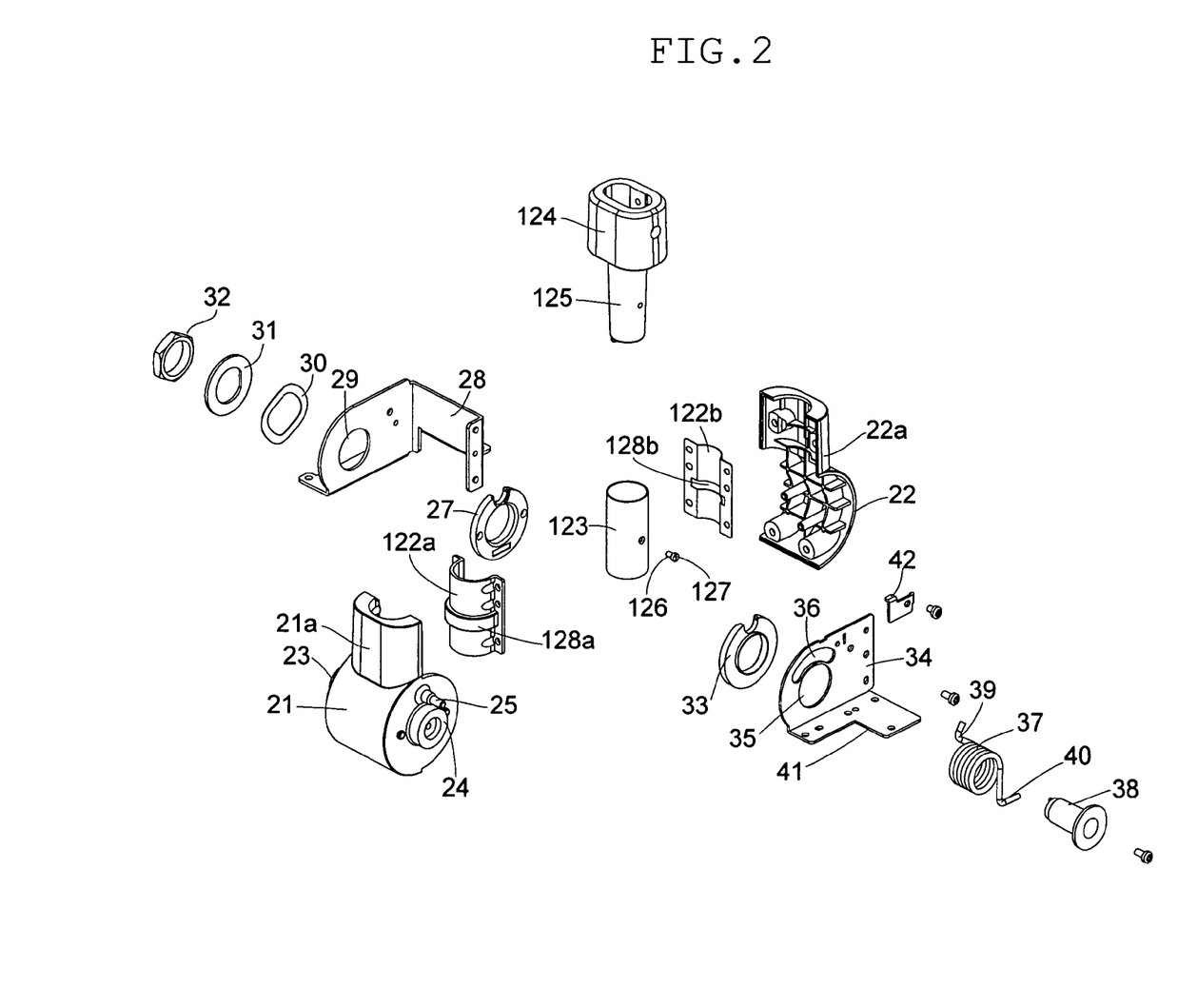
FIG. 2 is an exploded perspective view of an inclining section and pivoting section.
Figure 3:
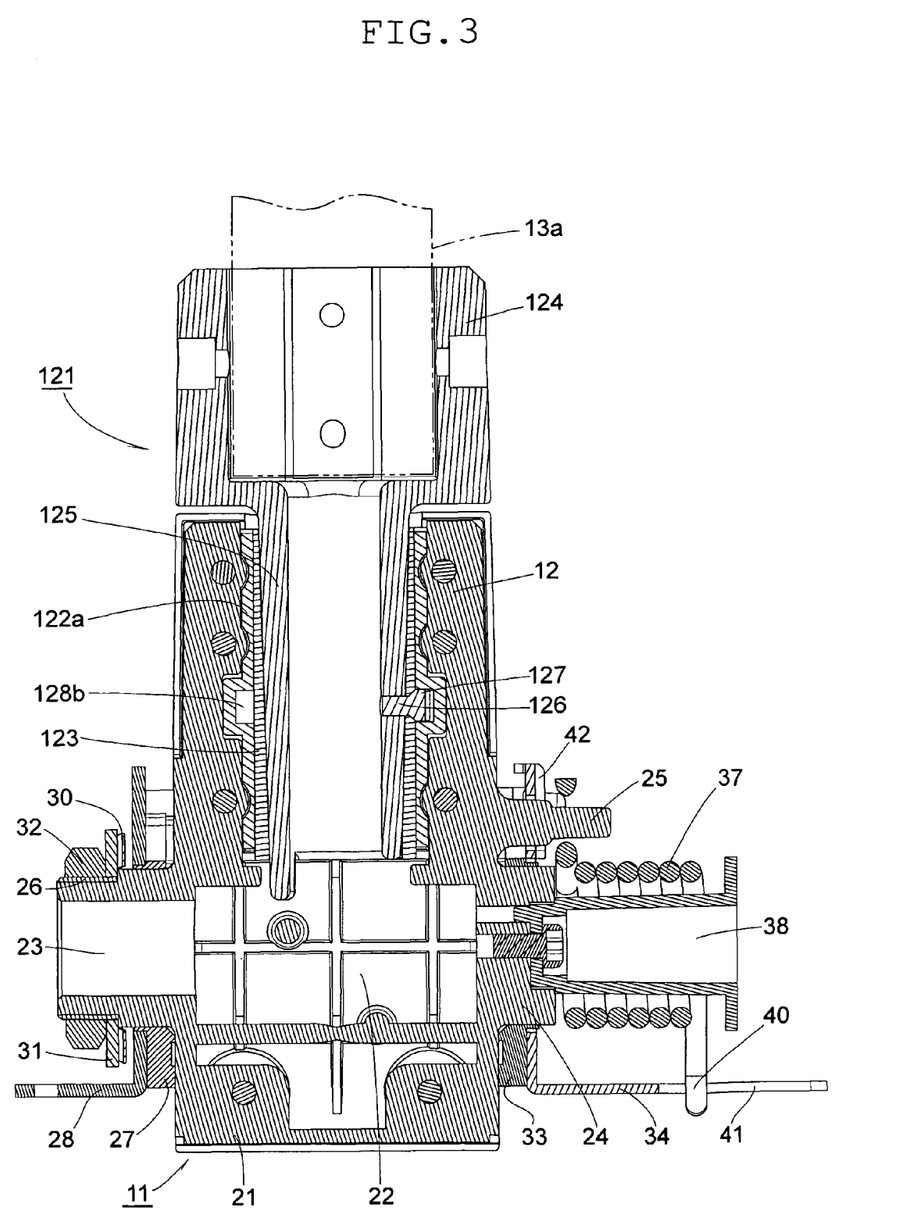
FIG. 3 is a sectional view of the inclining section and pivoting section.
Figure 4:
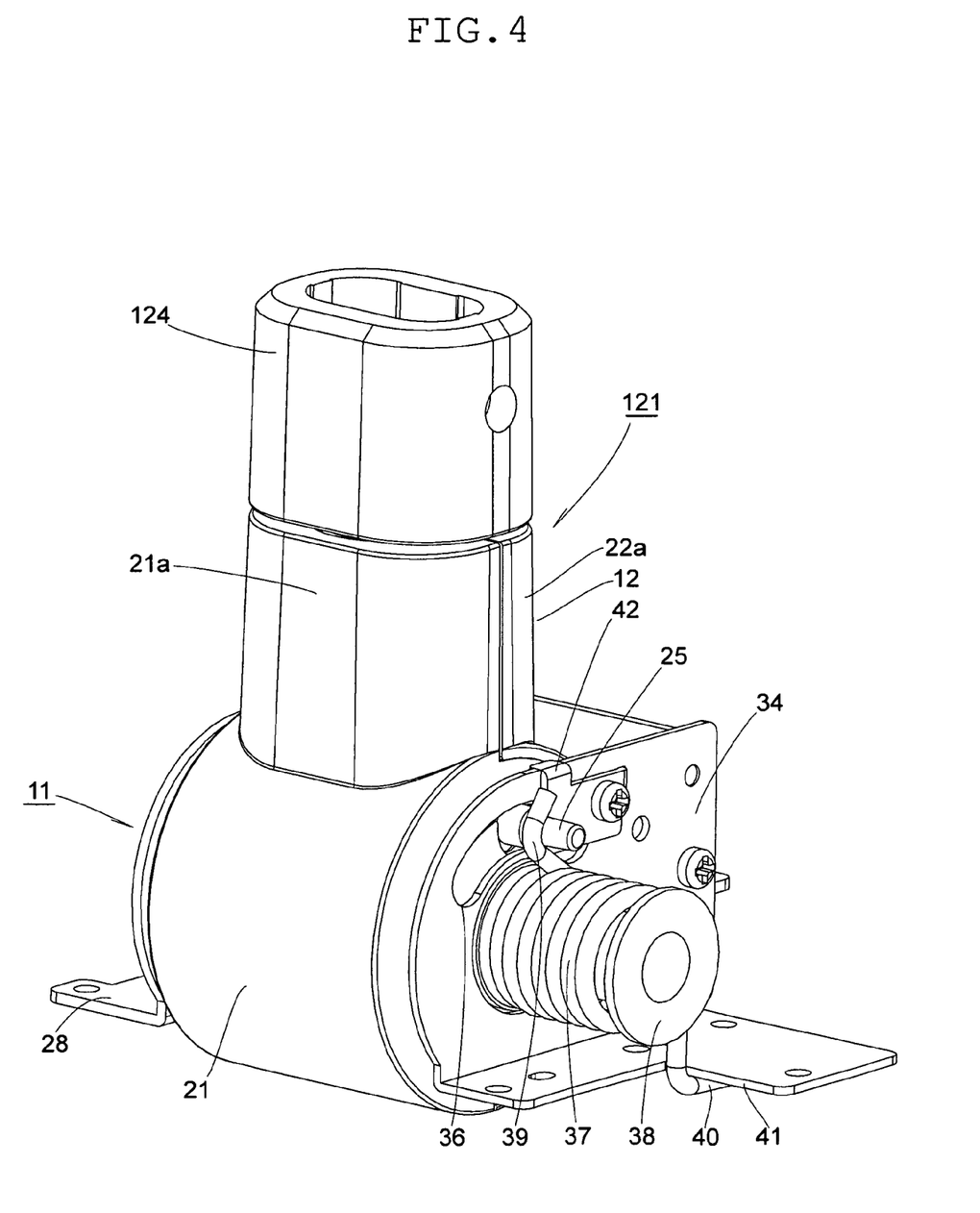
FIG. 4 is a perspective view of the inclining section and pivoting section.

Referring now to FIGS. 2 to 4, the tilting section 11 includes a body member 21 and a cover member 22 integrated together. The body member 21 is made from aluminum by die-casting, whereas the cover member 22 is made from resin. A cover member 22 is integrated with a body member 21 such that a support piece 21a protruding from an upper surface of the body member 21 is integrated with another support member 22a protruding from an upper surface of the cover member 22, whereby the pivot shaft support 12 is constituted.

The body member 21 has a hollow shaft 23 formed on a left side thereof and a shaft 24 and a spring hook pin 25 both formed on a right side thereof. The hollow shaft 23 has a distal end on which a male screw 26 is formed. The hollow shaft 23 is inserted through a shaft support hole 29 of a bracket 28 fixed in the base 3 with a spacer 27 being fitted on shaft 23. A corrugated washer 30 and a flat washer 31 are fitted on a part of the hollow shaft 23 protruding from the shaft support hole 27. The corrugated washer 30 and a flat washer 31 are tightened up against the bracket 28 by a nut 32.

On the other hand, the right-hand shaft 24 is inserted through a shaft hole 35 of a bracket 34 fixed in the base 3 with a spacer 33 being interposed therebetween. The spring-holding pin 25 is inserted through an arc hole 36 formed in the bracket 34 so as to be concentric with the shaft hole 35. The shaft 24 has an end to which a spring-attaching shaft 38 with a return spring 37 is fixed.

The return spring 37 has one end formed with a hook 39 hooked on the pin 25 and the other end also formed with a hook 40 which is hooked on a spring hook 41 of the bracket 34. The return spring 37 imparts a turning force on the support column 13 standing on a column holder 124 in such a direction that the support column 13 rises from a forwardly-tilting position. The bracket 34 is provided with a stopper 42 controlling the rising state of the support column 13 against which the pin 32 abuts.

The pivoting portion 121 on the tilting portion 11 includes a bearing 122 constituted by bearing pieces 122a and 122b fixed in the pivot shaft support 12, a pivot sleeve 123 and a support holder 124. The support holder 124 has an underside on which a pivot shaft 125 is integrally formed.

Figure 5:
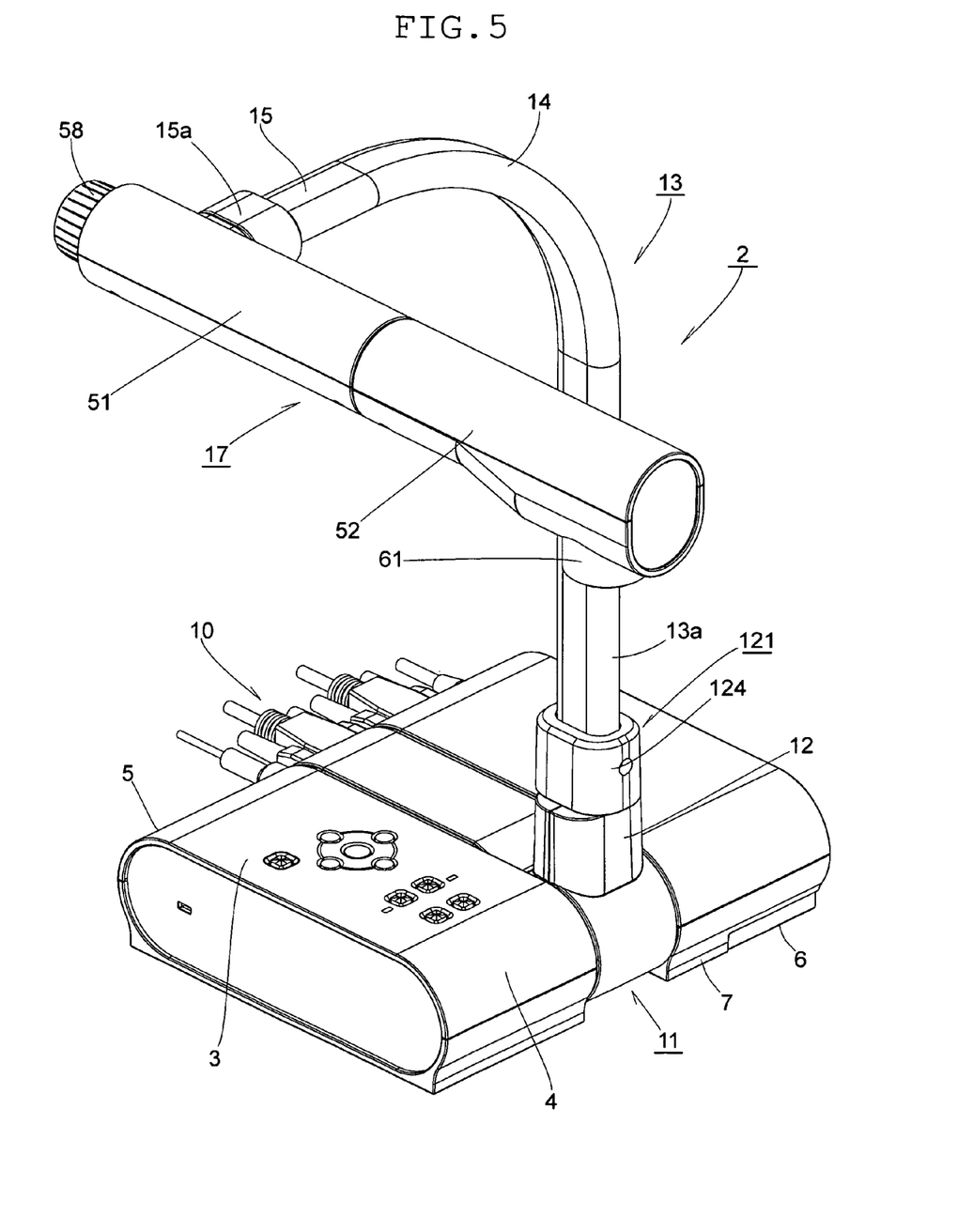
FIG. 5 is a perspective view of a support column.
Figure 6:
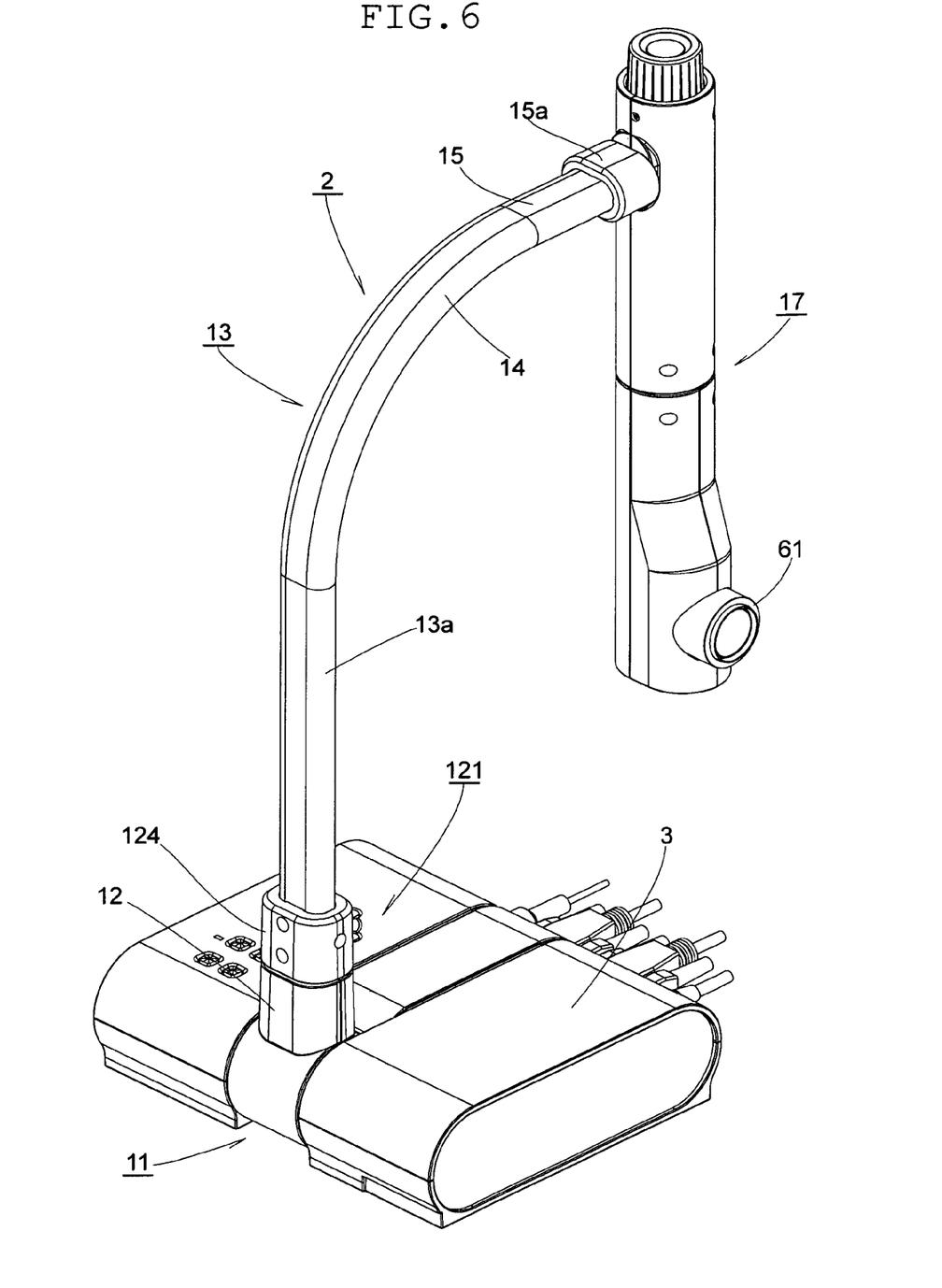
FIG. 6 is a perspective view showing a pivoting manner of the support column.

The bearing pieces 122a and 122b are integrated together into the bearing 122 which bears a pivot sleeve 123 so that the pivot sleeve 123 is pivotable. The pivot shaft 125 of the support holder 124 is inserted through the pivot sleeve 123, and the pivot shaft 125 and pivot sleeve 123 are tightened up by a tightening screw 126. The bearing pieces 122a and 122b have grooves 128a and 128b which are formed in outer peripheries thereof so as to allow a pivotal movement of a head 127 of the tightening screw 126 protruding from an outer circumference of the pivot sleeve 123, respectively. The support column 13 includes an upright portion 13a which has a lower end inserted into the support holder 124. The upright portion 13a and the support holder 124 are tightened up by a tightening screw 129, thereby being fixed. Since the pivot sleeve 123 to which the column holder 124 is tightened up is held so as to be pivotable, the upright portion 13a is caused to pivot together with the column holder 124, whereby the horizontal portion 15 is caused to pivot horizontally over the base 3. See FIGS. 5 and 6.

Figure 7:
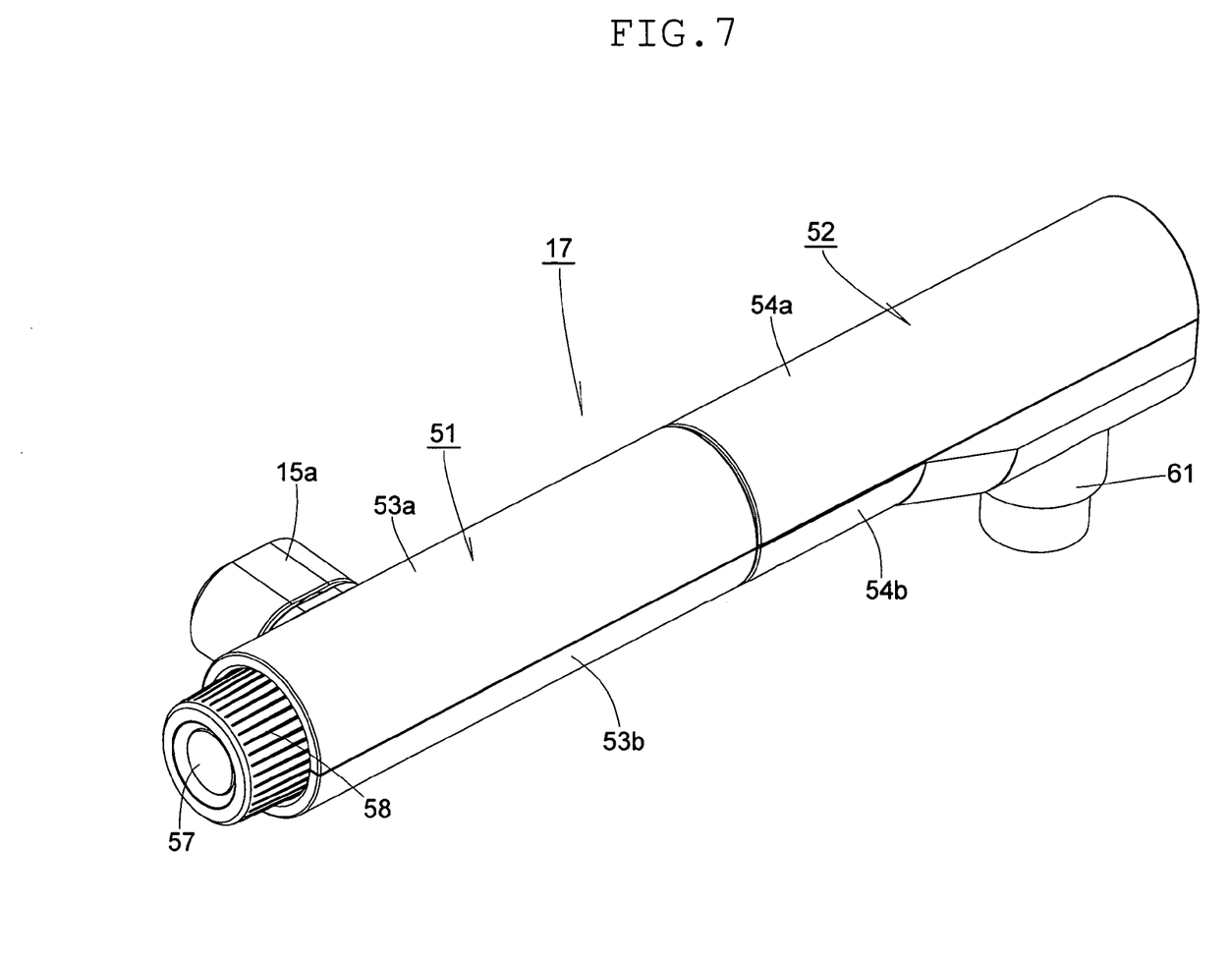
FIG. 7 is a perspective view of an imaging camera head.

FIG. 7 is a perspective view of the imaging camera head 17. The imaging camera head 17 comprises a slender shaft support 51 and a slender camera head 52. The shaft support 51 includes upper and lower two-split cylindrical cases 53a and 53b both made of a synthetic resin. The camera head 52 also includes upper and lower two-split cylindrical cases 54a and 54b both made of a synthetic resin.

Figure 8:
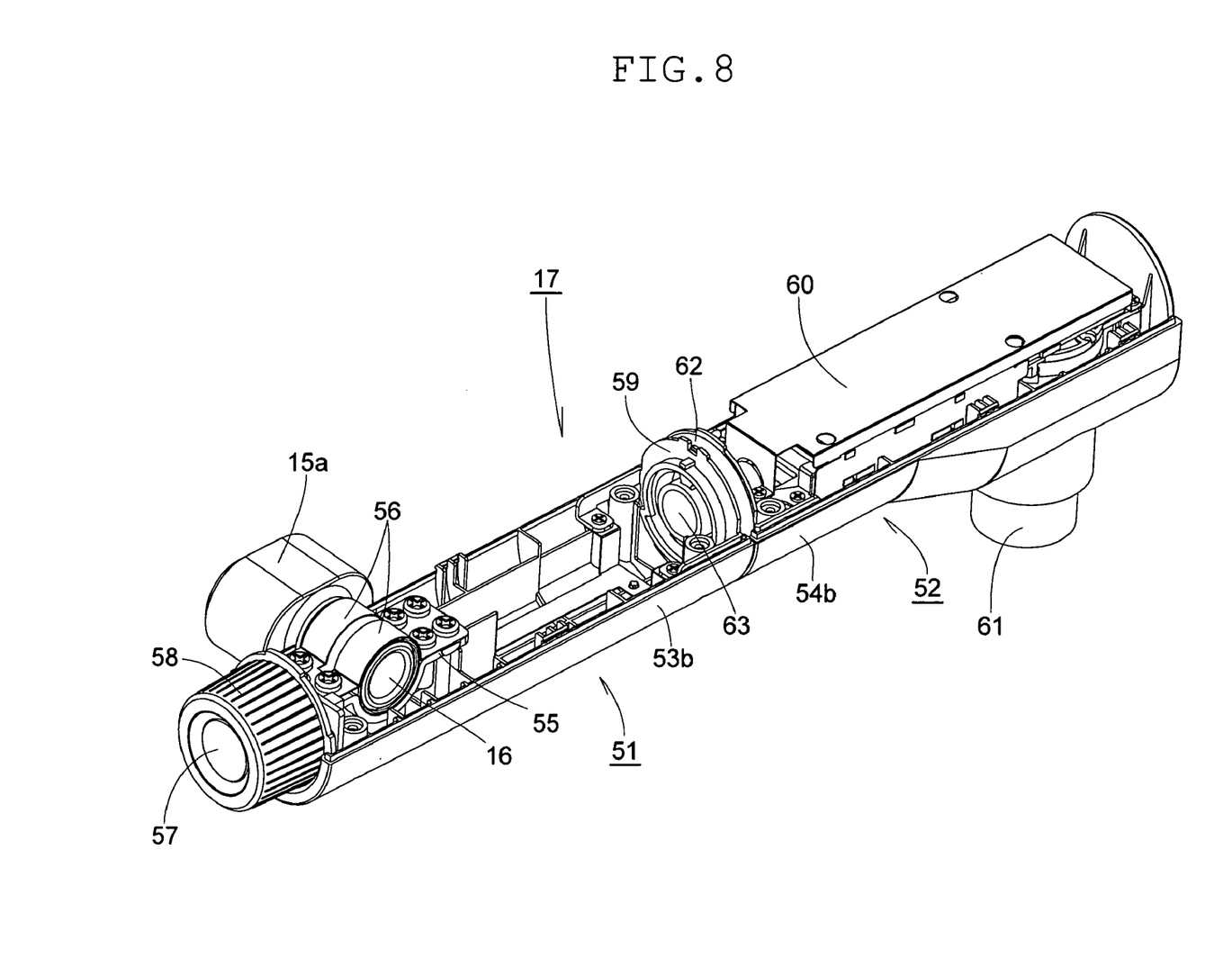
FIG. 8 is a perspective view showing an inside of the imaging camera head.

The lower case 53b of the rotational shaft support 51 has an end having a side into which the pivot shaft 16 mounted on the distal end of horizontal portion 15 is inserted, as shown in FIG. 8. The pivot shaft 16 is pivotally mounted on a pivot bearing 55 by a tightening piece 56 screwed to the pivot bearing 55 provided on case 53b. When a part of the pivot bearing 55 is formed on the end of the rotational shaft support 51 as described above, the distance from the pivot bearing 55 to the other end of the camera head 52 is longer than the distance from the pivot bearing 55 to one end of the rotational shaft support 51. Furthermore, the case 53b is provided with a stopper (not shown) which limits a pivoting angle of the pivot shaft 16 to 90 degrees.

A detent mechanism (not shown) is provided between the case 53b and the pivot shaft 16 for offering a crisp feel at every 90-degree pivot. A zoom dial 58 with a centrally incorporated autofocus button is rotatably mounted on a proximal end of the case 53b. A coupling shaft bracket 59 is mounted on a side end opposite to the zoom dial 58.

Figure 9:
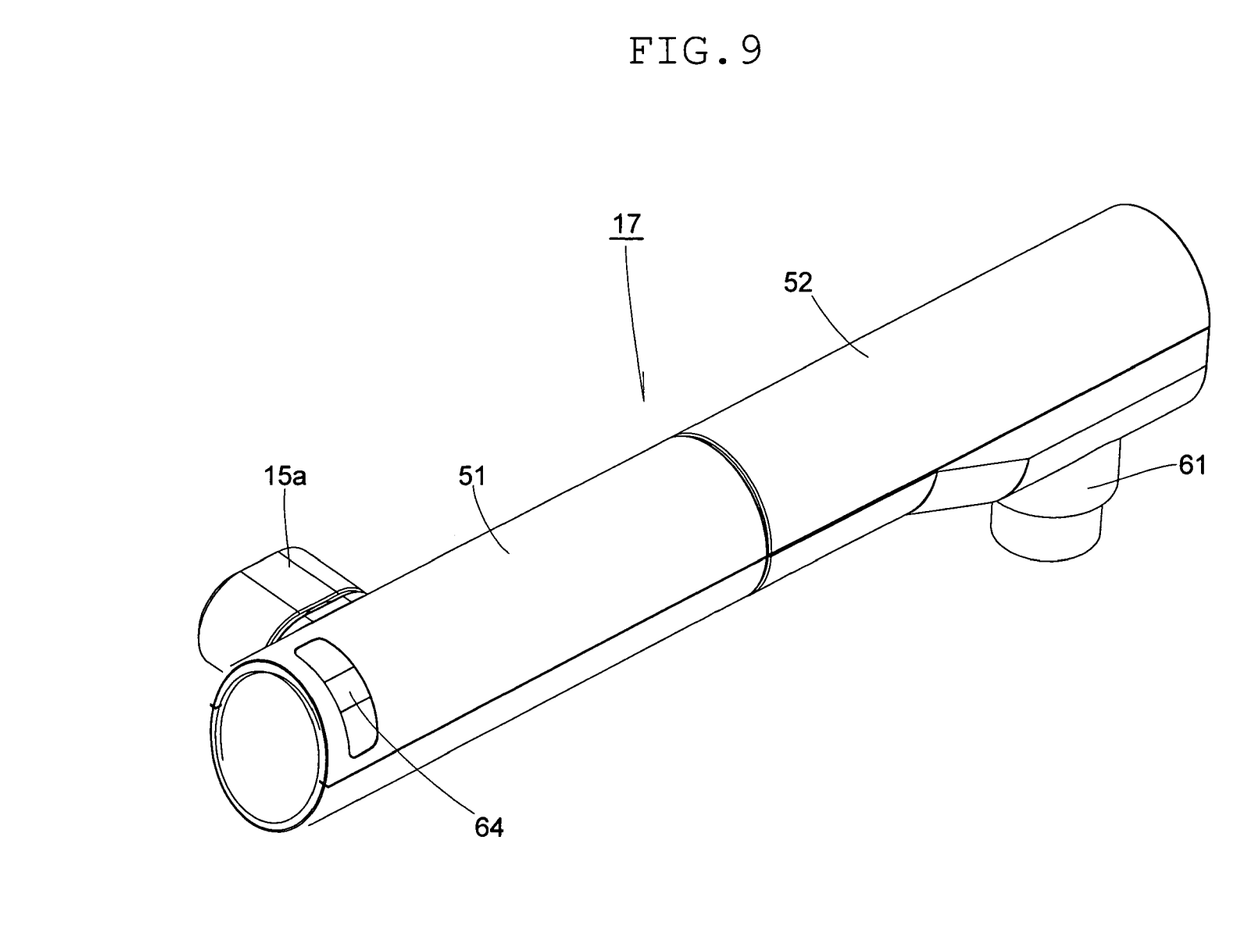
FIG. 9 is also a perspective view of another form of the imaging camera head.

A camera control circuit unit 60 for the imaging camera head 17 is mounted on the lower case 54b of the camera head 52 as shown in FIG. 8. A lens barrel 61 is formed on a lower distal end of the case 53b so as to protrude. A coupling shaft bracket 62 is mounted on the proximal end of the case 54b. A hollow coupling shaft 63 is inserted between the bracket 59 of the case 53b and the bracket 62 of the case 54b. The camera head 52 is pivotally coupled to the shaft support 51 by the coupling shaft 63. The imaging camera head 17 may comprise an operation knob 64 or the like, instead of the zoom dial 58, as shown in FIG. 9.

The control circuit unit 8 disposed in the base 3, the camera control circuit unit 60 and the zoom dial 58 with incorporated autofocus button 57 and the like are electrically connected to one another. A wire harness ensuring the electrical connection is arranged through the hollow shaft 23 of the tilting section 11, the support column 13, the hollow pivot shaft 16 and the coupling shaft 63. The above-described body 2 is caused to pivot about the pivot shaft 16 of the pivot shaft support 51 of the imaging camera head 17 from the steady state as shown in FIGS. 1 and 8, so that the body 2 can be changed from the horizontal state to the vertical state.

Figure 10:
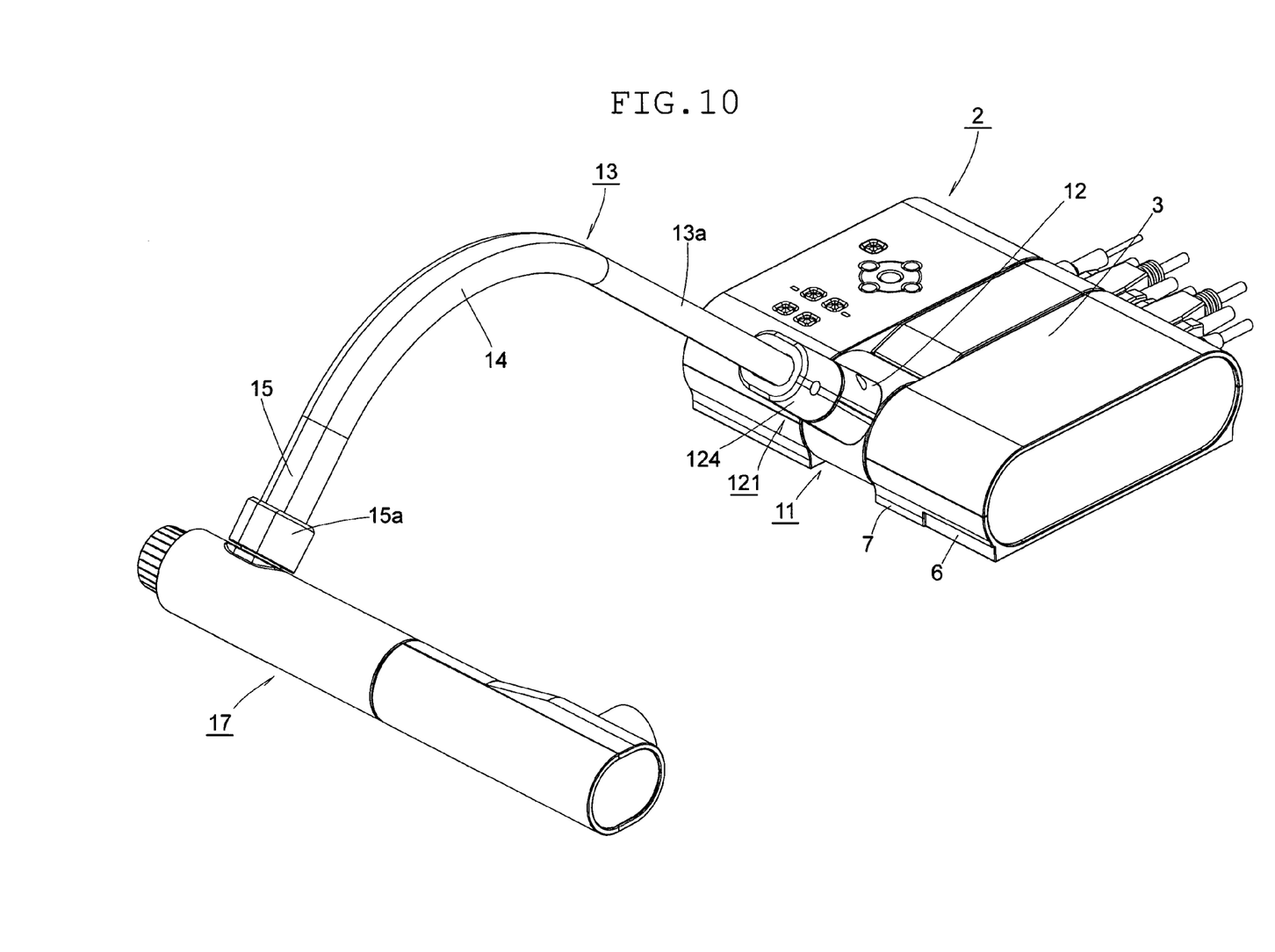
FIG. 10 is a perspective view of a support column.

Furthermore, the provision of the tilting section 11 can change the body 2 into a state where the column 13 is tilted forward as shown in FIG. 10. When the column 13 is tilted forward, the weight 9 disposed in the base 3 prevents the rear 5 side of the base 3 from rising. Furthermore, a nut 30 applies a braking force via the washers 28 and 29 to the tilting section 11 between the brackets 26 and 34. Additionally, the return spring 37 biases the shaft 31 of the tilting section 11 in such a direction that the forwardly inclined support column 13 rises. Accordingly, when a pivoting moment of the column 13 with the imaging camera head 17 mounted thereon, the clamping force of the nut 30 and a biasing force of the return spring 37 are adjusted so as to become head-to-head or substantially equal to one another, the support column 13 can be stopped at any forward tilt angle, that is, a free stop mechanism can be provided. Furthermore, when the support column 13 is returned from the forward tilting state to the rising state, the support column 13 can easily be caused to rise with assistance of the biasing force of the return spring 37.

FIG. 11 shows a stage 100 coupled to the body 2 in use. The stage 100 has an upper surface or placement surface 101. Furthermore, the stage 100 has a front edge formed with a positioned member 102 coupled to the positioner 7 of the base 3. The positioned member 102 is formed with a right-angled estimation portion 103 which has one side on which a magnetic piece 104 is affixed. See FIG. 12.

Figure 12:
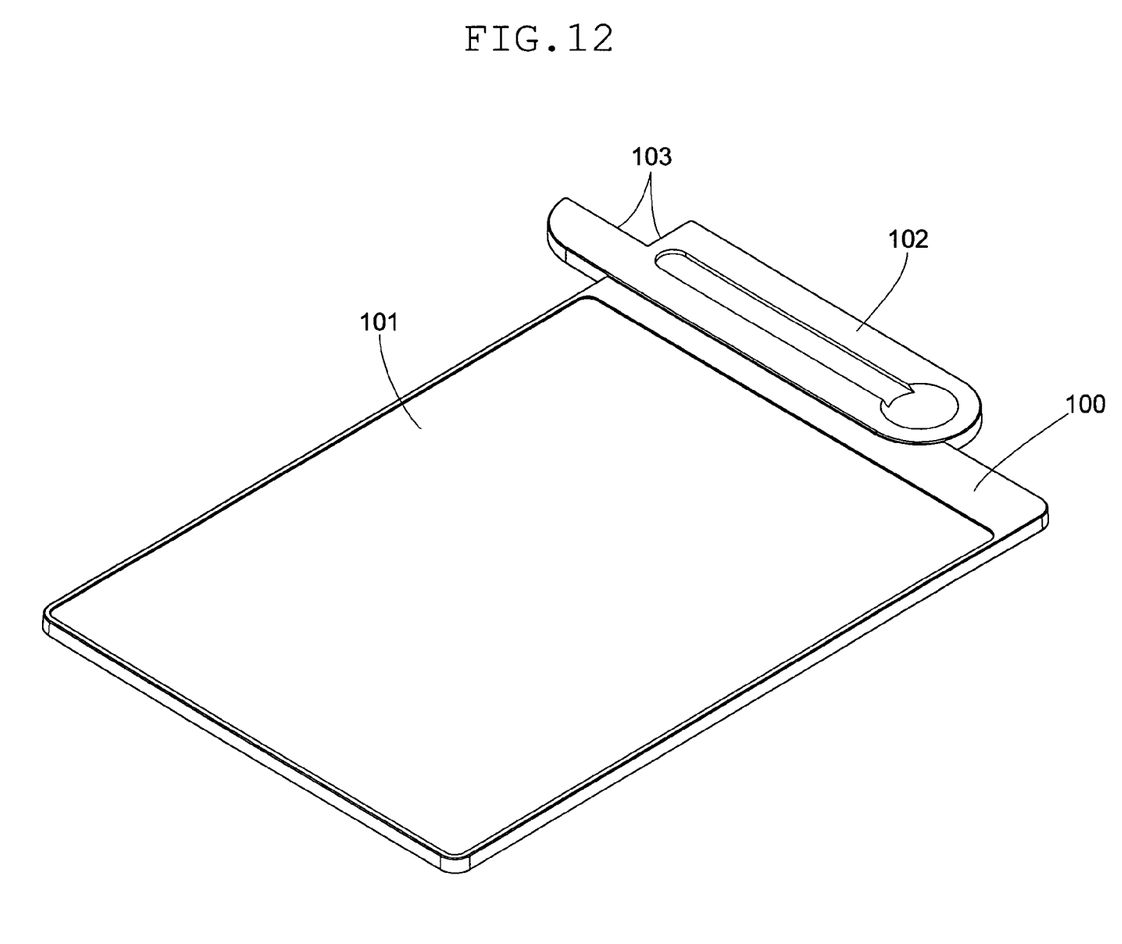
FIG. 12 is a perspective view showing a positioning portion and a positioned portion.

The aforesaid positioner 7 and the positioned member 102 are coupled together by an attractive force of the magnet. In this case, the right-angled corner of the base 3 abuts against the estimation portion 103 so that the placement surfaces 101 of the stages 100a to 100d are positioned so as to correspond to an imaging range of the imaging camera head 17 in the normal state of the body 2 and so that a central part of the placement surface 101 corresponds to a central part of the imaging range of the imaging camera head 17.

According to the above-described embodiment, the support column 13 comprises the upright portion 13a standing from the base 3, the curved portion 14 formed so as to be continuous from upright portion 13a and the horizontal portion 15 formed by bending the distal end of the upright portion 13a so that the horizontal portion 15 protrudes forward away from the base 3. Thus, since the support column 13 has no joints and hinges, the structure thereof can be simplified and accordingly, the operability and easiness to store can be improved. Furthermore, the pivot 121 is provided on the upright part 13a of the support column 13 so that the horizontal portion 15 is pivotable horizontally. As a result, the imaging camera head 17 and the horizontal portion 15 protruding toward the front side of the upright part 13a can be moved over the base 3. Consequently, the visual presenter can be rendered more compact when stored.

The horizontal portion 15 has the distal end on which the pivot shaft 16 is mounted so as to extend in the protruding direction of the horizontal portion 15. The imaging camera head 17 is pivotally mounted on the pivot shaft 16. The imaging camera head 17 and the horizontal portion 15 protruding toward the front side of the base 3 can be moved over the base when the visual presenter is stored, and the camera head can be rendered perpendicular to the base 3. Consequently, the visual presenter can be rendered more compact when stored. Additionally, when the stage 100 is not used, the support column 13 is caused to pivot so as to be set along the front or side of the base 3 according to the size of material to be imaged, a direction of display image or the like. Consequently, the usability of the visual presenter can be improved.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A visual presenter comprising:
a base;
an upright support column standing from the base and having a distal end, said support column being coupled to said base such that said support column is pivotable towards and away from said base;
a curved portion formed on said distal end of said support column, said curved portion having a distal end;
a horizontal portion formed at the distal end of the curved portion so that the horizontal portion protrudes forward away from the base, the horizontal portion having a distal end;
an imaging camera head mounted on the distal end of the horizontal portion; and
a pivot portion provided on the upright portion of the support column so that the horizontal portion is pivotable horizontally relatively to said base; and wherein said support column curved portion and horizontal portion are integrally formed.

2. The visual presenter according to claim 1, further comprising a pivot shaft which is provided on the distal end of the horizontal portion so as to be coaxial with the horizontal portion, wherein the imaging camera head is pivotally mounted on the pivot shaft.

* * * * *